United States Patent Office 3,348,705
Patented Oct. 24, 1967

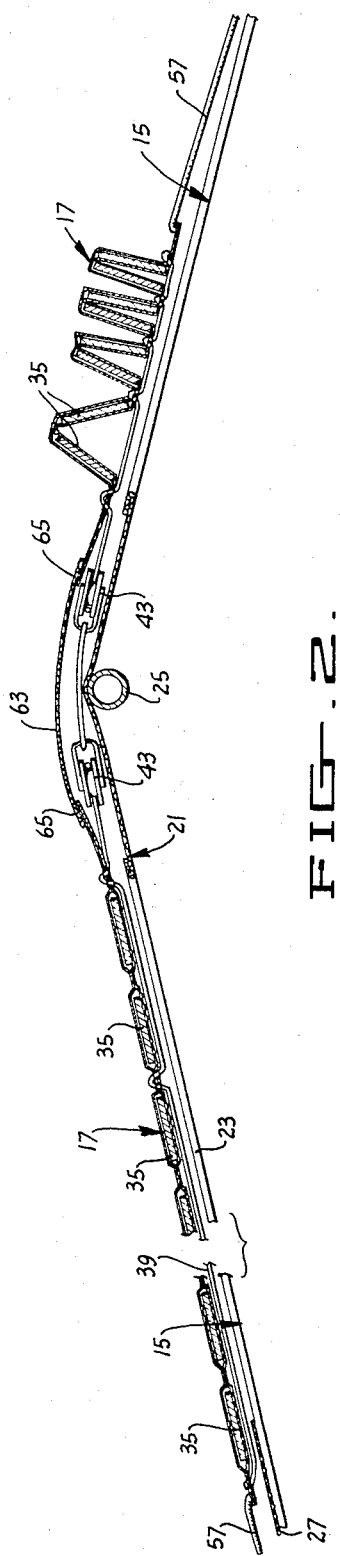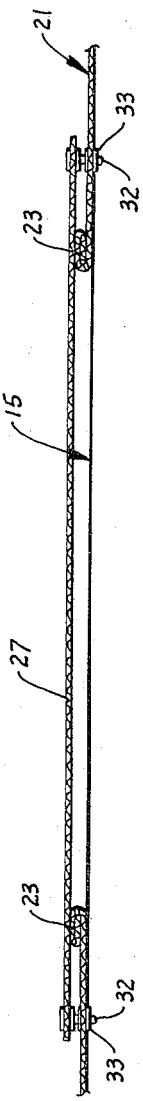

3,348,705
WEATHER TENT FOR CARGO HATCHES
Harold H. Yanow, 528 15th Ave.,
San Francisco, Calif. 94118
Filed July 2, 1965, Ser. No. 469,234
18 Claims. (Cl. 214—15)

This application is a continuation-in-part of my copending application Ser. No. 456,932, filed May 19, 1965, for Weather Tent for Cargo Hatches.

This invention relates to improvements in a weather tent for cargo hatches, and more particularly to removable structures intended to keep rain from falling through an open hatch during loading or unloading operations.

As stated in my co-pending application, whenever a cargo which must be kept relatively dry is being loaded onto or unloaded from a ship, rainstorms present a serious problem. Many types of cargo cannot stand the entry of rain into the ship's hold, and unless the hatch is covered in such manner as to exclude rain, cargo loading and unloading operations must cease while tarpaulins or the like are arrayed in covering relation across the open hatch.

Halting of cargo loading and unloading operations is extremely expensive because every extra moment spent at dockside detracts from the earning capacity of the ship. Also, the longshoreman crews must be paid if they are called out, even though they may be idled by the necessity for sealing off the hatches during a rainstorm. This often puts the operator to the choice of paying a longshoreman crew for standing idle in case it does rain, or not hiring a crew and taking a chance that it will not rain and cargo loading or unloading operation could be resumed so as to cut down dockside time.

Attempts have been made to solve this problem by providing canvas awnings or tents positioned to keep most of the rain out of the open hatch and still permit cargo loading and unloading operations. The most widely used of these devices consists of a pair of large canvas flies supported in the rigging over the hatch in the manner of a double pitch tent roof. The flies are separated slightly to provide a slot accommodating passage of the cable used to transport the individual loads of cargo. To use this type of tent, it is necessary that the cable move along a straight line coincident with the slot. However, ships use several types of loading and unloading systems and the type of tent under discussion is not suitable for use with many of them. For example, many ships utilize shipboard cranes which revolve between a position overlying the hatch and a position overlying the adjacent dock. The cables of such cranes move through an arc and it is obviously impossible to utilize the previously described tent construction.

My aforesaid copending application discloses a tent-like structure which may readily be placed in a covering position across an open hatch to keep out the rain. Generally, the structure disclosed therein includes a lightweight frame which may be easily assembled and disassembled and a flexible cover therefor. The structure is also provided with one or more cargo loading or unloading openings or ports which are sized to accommodate standard cargo loads. The cargo openings are provided with means for blocking or closing off the openings when not actually required, and this means opens and closes automatically on demand. The framework and cover disclosed in my copending application are constructed in such a manner as to permit their being stowed in a relatively small space abroad the ship and also are adapted for rapid assembly and installation by the ship's personnel should a storm blow up.

The present application is concerned primarily with the structure of the automatically operating closure means for the cargo loading opening through the hatch tent and, as a principal object, provides an improved hatch cover which is capable of preventing rain from entering, while permitting cargo to be passed through the hatch.

Another object of this invention is the provision of an improved hatch cover or tent of the type described having an access aperture for loading and unloading cargo, the aperture being automatically opened when it is required to pass cargo therethrough, and being automatically closed when it is not required to pass cargo therethrough, thereby providing maximum protection from the entry of rain through the opening.

A further object of the present invention is the provision of an improved hatch tent such as described in which the cargo access aperture opens in response to a load of cargo approaching the aperture.

A still further object of the invention is the provision of an improved hatch tent of the class described in which the aperture closes automatically in accordance with the movement of the cargo transporting apparatus away from the hatch.

Another object of the invention is the provision of an improved hatch tent or cover for preventing rain from entering a ship's hold while permitting cargo to be passed through the hatch tent into the hold, with the structure being stowable in a small area abroad ship, in knocked-down form, so as to be quickly available whenever threatening weather is encountered during cargo loading or unloading operations.

Another object of this invention is the provision of an improved temporary hatch tent or cover such as described in which the cargo aperture therein is selectively positionable to allow the cargo to be dropped through different areas of the hatch, as desired.

A still further object of this invention is the provision of an improved hatch tent or cover which is of yieldable construction to minimize damage should the cargo accidentally be dropped on or swung against it, and which may be quickly and easily repaired on board ship without requiring special machine tools or the like.

A further object of this invention is the provision of an improved hatch tent which is constructed of lightweight materials and is relatively simple to install.

Yet another object of the present invention is the provision of a hatch cover such as described which is adapted for use with any and all types of cargo loading and unloading systems in which the load of cargo is lowered into or raised out of the hold through a deck hatch by means of a cable.

Further objects and advantages of my invention will be apparent as the specification progresses, and the new and useful features of my weather tent for cargo hatches will be fully defined in the claims attached hereto.

In the accompanying drawing, in which one of various possible embodiments of the invention is illustrated, FIGURE 1 is a perspective view of a hatch tent constructed in accordance with the present invention and installed in operating position on the hatch of a ship;

FIGURE 2 is an enlarged section taken along line 2—2 of FIGURE 1; and

FIGURE 3 is an enlarged section taken along line 3—3 of FIGURE 1.

Figure 1:
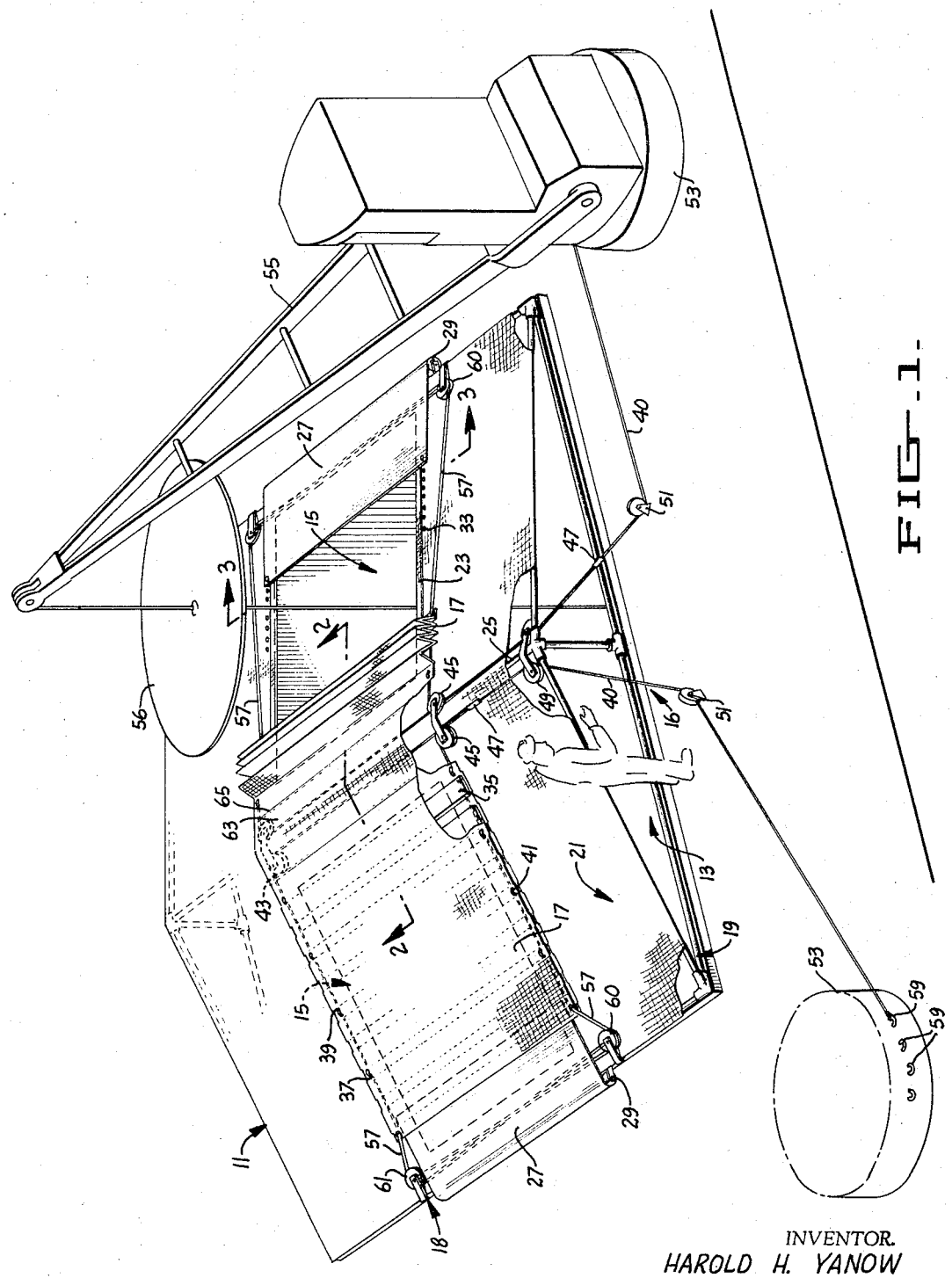

Referring now to the drawings, it will be seen that the weather tent for cargo hatches of the present invention generally comprises cover or tent means 11 adapted to be removably mounted over an open hatch 13 of the ship. The tent means 11 has one or more cargo apertures or openings 15 therein for loading and unloading cargo, the apertures being covered by shields or flexible closure members 17 which are normally located in an extended position to close the apertures, but which are adapted to be retracted to a position wherein the apertures are opened in response to the approach of cargo to permit the cargo to pass through the apertures. The shields 17 are preferably folded accordion-fashion in their retracted positions and partially or fully unfolded in their extended positions. This is accomplished by moving means 16 which selectively pulls one end of the shield toward the other end against the influence of biasing means 18 which tends to urge the ends apart.

More particularly, the tent means 11 includes a framework 19 removably mounted over the hatch 13 and a flexible tent covering 21 formed of a strong weatherproof sheet material, preferably a plastic coated nylon fabric such as Hypalon, supported on the framework 19 for keeping rain out of the hatch. The covering 21 is formed to provide the cargo access apertures or openings 15 and, as seen in FIGURE 3, has hems 23 forming ridges along the edges of the apertures 15 for preventing water from running across the covering into the apertures 15. The cargo access apertures or openings 15 are wide enough to comfortably accommodate the largest horizontal dimension of standard cargo loads and preferably extend from adjacent the lower end of the tent covering 21 to a point adjacent the ridge pole 25 of the framework 19.

The portion of the aperture 15 through which it is desired to lower cargo may be selected by means of an adjustable cover member 27 which is rolled up on a spring-loaded roller 29, similar to a window shade roller, connected to the lower portion of framework 19. The free end of each cover member 27 may be provided with finger-shaped fasteners or projections 32 at the lateral edges thereof adapted to engage in selected grommeted holes of two series of grommeted holes 33 located in covering 21 outside of hems 23. The lower ends of the openings 15 may be adjusted by moving the cover member 27 to various positions on the covering 21. Thus, it will be seen that if the fingers 32 of the cover member 27 are placed in the lowermost holes 33, such as shown on the left-hand side of the FIGURE 1 embodiment, the aperture or opening 15 will start adjacent that point and extend upwardly therefrom, while if the fingers 32 of the cover member 27 are placed in holes 33 located part-way up the tent covering 21, the effective opening of the adjacent aperture 15 will start at that point.

Each shield or closure member 17 is formed of a strong weatherproof flexible sheet material, preferably the same material as the tent covering 21, and includes a plurality of stiffening members 35 extending transversely across the shield. The stiffeners 35, which may be formed of any suitable material capable of supporting the shield material across the opening, such as wood or relatively rigid plastic, may be contained in transverse pockets formed in the shield material by cementing, sewing or any other conventional manner appropriate to the material used. Two series of grommeted holes 37 extend up opposite sides of each shield 17 to accommodate tightening lines 39 and 41 which are part of moving means 16. The lines 39 and 41 may be formed of any flexible, elongated connecting material, such as cord or the like, and are connected at their lower ends to the lower portion of the shield 17.

As here shown, in order to equalize pulling forces and prevent cocking, pulleys 43 and 45 are secured to the ridge pole 25 adjacent the peak of the tent covering and line 39 passes around both pulleys 43 and 45, while line 41 passes only around pulley 45. The lines 39 and 41 are joined together as indicated at 47 so that the lines 39 and 41 become a single line 40 which is trained around another pulley 49 secured to the ridge pole 25. As will be obvious, pulling on line 40 will draw the lower end of shield 17 upwardly toward the peak of the tent, folding the shield in accordion or bellows fashion and uncovering cargo access opening 15.

As a feature of the present invention, the foldable shields 17 are adapted to be retracted to their folded positions automatically by the rotary swinging movement of ship loading cranes. In this connection, it should be observed that the present invention is suitable for use with any type of cargo loading and unloading apparatus in which the cargo is supported on a cable, but when the apparatus is used with rotating cranes, the cables 40 are trained around pulleys 51 and the ends of the lines are connected directly to the rotating portion, usually a base 53, of the cranes 55 in the manner illustrated in FIGURE 1. As the crane swings toward the opening 15 through which it is desired to lower cargo, the attached line 40 is wound onto the crane base 53 by an amount just sufficient to pull the lower end of the shield 17 toward the upper end a distance sufficient to uncover the cargo access aperture 15. The cargo moving apparatus carried on the end of the cable and any cargo supported thereby is then lowered through the aperture 15 into the hold. If desired, and as shown in my aforesaid copending application, the cable to which the cargo is connected may be provided with a circular, flattened umbrella member 56 which is adapted to slide on the cable so that the opening 15 will be covered as soon as the cargo drops therethrough, thus preventing rain from dropping onto the cargo in the hold.

After the cargo moving apparatus has been withdrawn from the hold through access opening 15, the crane 55 is swung back toward the wharf and, in so doing, permits the biasing means 18 to pull the lower end of the respective shield 17 back down to a position covering the opening. The biasing means is preferably resiliently yieldable and may comprise any suitable spring means. However, in order to simplify construction and replacement and to provide a resilient, weather-resistant structure, conventional elastic shock cord will ordinarily be preferred. As here shown, the biasing means comprises two shock cords 57 connected between the opposite sides of the lower end of shield 17 and a fixed support, such as a portion of the tent framework 19. Longer shock cords 57 may be provided by training them around pulleys, such as pulleys 60 and 61, carried on framework 19.

If it is desired to locate the aperture 15 closer to the peak of the tent, the adjustable cover member 27 is pulled upwardly the required distance and the projections 31 engage in holes 33, and the end of the line 40 is pulled around the base 53 of the crane to another connecting position 59. This allows the shock cords 57 to draw the shield 17 only part way down so that it just covers the upper end of the cover member 27.

A connecting cover portion 63 is joined at its ends by seams 65 to the upper ends of the shields 17 and to the tent covering 21. The portion 63 straddles the ridge pole 25 so that the pulleys 43 and 45 and their connections to the ridge pole are covered and so that rain is prevented from passing through the holes made in covering 21 by the pulley connections.

As shown in the drawings, the tent means 11 is of a double pitch configuration, i.e., the tent means is formed to provide a flattened, double pitch roof sloping downwardly toward the forward and aft ends of the hatch from a peak laterally transversing the hatch medially thereof. This double pitch configuration, with two cargo access apertures 15, is particularly suited for use on ships where multiple cargo hoisting devices will be utilized for each hatch. It will be apparent that if the hatches were large enough, additional cargo access apertures and their associated foldable shields could be provided. It should also be noted that a single pitch tent roof having a single cargo access aperture 15 and associated shield could be provided when and where desired.

It will be seen that, due to the nature of the materials used and the construction of this invention, should the cargo or its moving apparatus be accidentally lowered onto or swung against any of the areas adjacent the aperture 15, i.e., the tent covering 21, cover member 27, or the lower portion of the respective shield 17, in such a manner that the adjacent areas are torn or ripped, they may be easily repaired by cementing, bonding or sewing another portion of fabric, such as Hypalon, over the torn area. In this regard, it will be noted that there are no heavy, rigid panels, hinges or guideways near the opening which, if they were inadvertently deformed, would have to be removed and straightened before the apparatus would operate correctly. Moreover, since the apparatus of this invention is relatively lightweight, it is relatively easy to install, operate and maintain.

As various changes could be made in the above constructions without departing from the scope of the invention, it is intended that all matter contained in the above description or shown in the accompanying drawing shall be interpreted as illustrative and not in a limiting sense.

I claim:

1. In combination with cargo moving apparatus, a hatch cover comprising cover means adapted to be removably mounted over a ship's hatch for keeping rain out of said hatch and having an aperture therein for loading and unloading cargo, a foldable water impervious shield having means associated therewith for urging the shield toward an unfolded position closing said aperture, and a shield opening means operatively connected to said shield for urging the shield toward a folded position to open the aperture, said shield opening means being operatively connected to said cargo moving apparatus for automatic opening in response to the approach of cargo to allow part of the cargo moving apparatus and cargo carried thereby to pass through the aperture.

2. A hatch cover as set forth in claim 1 including an auxiliary cover adjustably mounted, and means for adjusting the shield opening means for varying the size of said aperture.

3. A hatch cover as set forth in claim 1 wherein said shield includes a plurality of stiffening members spaced apart from one another for facilitating folding of said shield.

4. A hatch cover as set forth in claim 1 wherein said shield opening means includes at least one line connected to one end of said shield and adapted to be connected to the cargo moving apparatus.

5. A hatch cover as set forth in claim 4 further comprising biasing means connected to said shield for pulling one end away from the other end to unfold the shield and close the aperture as the cargo moving apparatus moves away from the hatch, said biasing means being yieldable to said shield opening means, whereby the shield opening means can selectively operate to open the aperture in opposition to the biasing means and close the aperture by relaxing its opposition to the biasing means.

6. A hatch cover as set forth in claim 5 wherein said shield includes a plurality of stiffening members spaced apart from one another for facilitating folding of said shield.

7. A hatch cover as set forth in claim 6 including means for varying the size of said aperture.

8. A hatch cover as set forth in claim 7 wherein said means for varying the size of said aperture comprises a flexible covering spanning the aperture, and means mounting said flexible covering to permit one end of the covering to be pulled to desired positions covering a portion of said aperture, said one end of the flexible covering having means for securing same to the said cover means adjacent said aperture at said desired positions.

9. A hatch cover as set forth in claim 8 wherein said cover means includes ridges along edges of said aperture to prevent water running across the cover from entering said aperture.

10. In combination with cargo moving apparatus, a hatch tent comprising tent means adapted to be removably mounted over a ship's hatch for keeping rain out of said hatch and having at least one opening therein for loading and unloading cargo, a foldable rain shield movable between an unfolded position wherein it covers said opening against the ingress of rain and a folded position wherein it uncovers said opening, and moving means operatively connected to said shield for urging the shield toward a folded position to open the aperture, said moving means being operatively connected to said cargo moving apparatus for autmatic opening in response to the approach of cargo carried by cargo moving apparatus to permit the cargo to pass through the opening.

11. A hatch tent as set forth in claim 10 wherein said shield includes a flexible member and a plurality of stiffening members spaced apart from one another and connected to said flexible member, said stiffening members extending in a direction substantially normal to the direction in which the shield is folded.

12. A hatch tent as set forth in claim 11 wherein said flexible member has a series of holes therein along each of two opposite sides thereof overlaying the tent on each side of the opening therein, said moving means including a pair of lines each extending through a different series of said holes and connected at one end to one end of said flexible member.

13. A hatch tent as set forth in claim 10 wherein said tent means includes ridges along edges of said opening to prevent water running across the tent from entering into said hatch through said opening.

14. A hatch tent as set forth in claim 12 wherein said tent means is of double pitch configuration and is formed with an opening and a shield on each side of the tent, said tent further including pulleys connected to said tent means and around which said lines are entrained, and a cover member connected at its opposite ends to said shields and extending over said pulleys.

15. A hatch tent as set forth in claim 11 wherein said flexible member is formed with a plurality of pockets, said stiffening members being located in said pockets.

16. A hatch tent as set forth in claim 15 wherein said flexible member has a series of grommeted holes therein along each of two opposite sides thereof, said series extending in a direction generally perpendicular to the stiffening members, said moving means including a pair of lines each extending through a different series of said holes and connected at one end to one end of said flexible member, said flexible member being folded in accordion fashion in response to the approach of cargo.

17. A hatch tent as set forth in claim 15 further comprising elastic cords connected to one end of said shield for pulilng said one end away from the other end to unfold the shield and close the opening when the moving means releases its opening action as the cargo moving apparatus moves away from the hatch.

18. A hatch tent as set forth in claim 17 further comprising a plurality of pulleys connected to said tent means, said elastic cords being trained around said pulleys.

References Cited

UNITED STATES PATENTS 1,229,523    6/1917    Roehrich            160—84

FOREIGN PATENTS 295,046    1/1929    Great Britain.

GERALD M. FORLENZA, *Primary Examiner.*

ROBERT G. SHERIDAN, *Examiner.*